United States Patent [19]
Abe et al.

[11] Patent Number: 4,730,585
[45] Date of Patent: Mar. 15, 1988

[54] DIESEL ENGINE FUEL INJECTION SYSTEM WITH A RATE-OF-INJECTION CONTROL ARRANGEMENT

[75] Inventors: Seiko Abe, Okazaki; Toshihiko Igashira, Toyokawa; Yasuyuki Sakakibara, Nishio; Akihiro Izawa; Kiyonori Sekiguchi, both of Aichi, all of Japan

[73] Assignee: Nippon Soken, Inc., Nishio, Japan

[21] Appl. No.: 878,772

[22] Filed: Jun. 25, 1986

[30] Foreign Application Priority Data

Jun. 28, 1985 [JP] Japan .................. 60-142744

[51] Int. Cl.$^4$ .................................. F02M 39/00
[52] U.S. Cl. ................... 123/300; 123/447; 123/506; 123/496
[58] Field of Search ........... 123/299, 300, 506, 446, 123/449, 447, 458, 459, 496, 512

[56] References Cited

U.S. PATENT DOCUMENTS

| 3,759,239 | 9/1973 | Regneault | 123/294 |
| 4,579,096 | 4/1986 | Kobayashi | 123/299 |
| 4,586,480 | 5/1986 | Kobayashi | 123/458 |

FOREIGN PATENT DOCUMENTS

| 59-3160 | 1/1984 | Japan | 123/447 |
| 0012131 | 1/1984 | Japan | 123/459 |
| 59-18249 | 1/1984 | Japan . | |
| 0155570 | 9/1984 | Japan | 123/459 |
| 0200059 | 11/1984 | Japan | 123/458 |
| 0230547 | 11/1985 | Japan | 123/299 |

Primary Examiner—Carl Stuart Miller
Attorney, Agent, or Firm—Cushman, Darby & Cushman

[57] ABSTRACT

A fuel injection system comprising a fuel injection pump, at least one fuel injection nozzle connected thereto, and a control device for varying the rate of injection of the system according to varying engine parameters. The control device has a variable volume chamber, the volume of which is varied by a piston located by a piezoelectric actuator. The variable volume chamber and a pumping chamber of the pump is intermittently connected by a passage which is specifically designed in such a manner that the fluid communication between the chambers, during the delivery stroke of a pump plunger, is provided only for an initial stage of the delivery stroke. A rate of injection is controlled in the initial stage to perform a pilot injection. In the subsequent stage, in which there is no need for rate-of-injection control, the variable volume chamber is isolated from the pumping chamber in order to relieve the piezoelectric actuator from an excessively high fuel pressure that would cause degradation of the piezoelectric elements.

8 Claims, 31 Drawing Figures

INTAKE STROKE

INITIAL STAGE OF
DELIVERY STROKE

INTERMEDIATE STAGE
OF DELIVERY STROKE

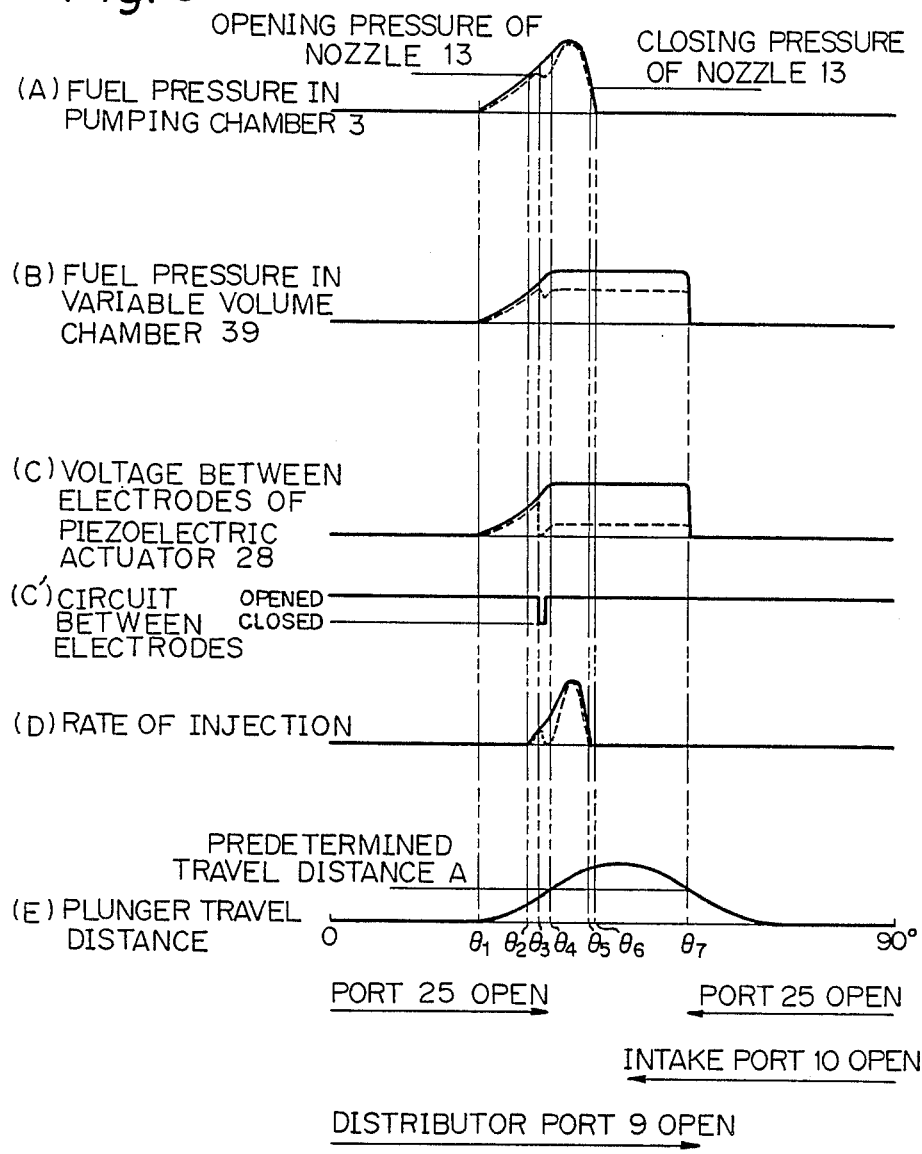

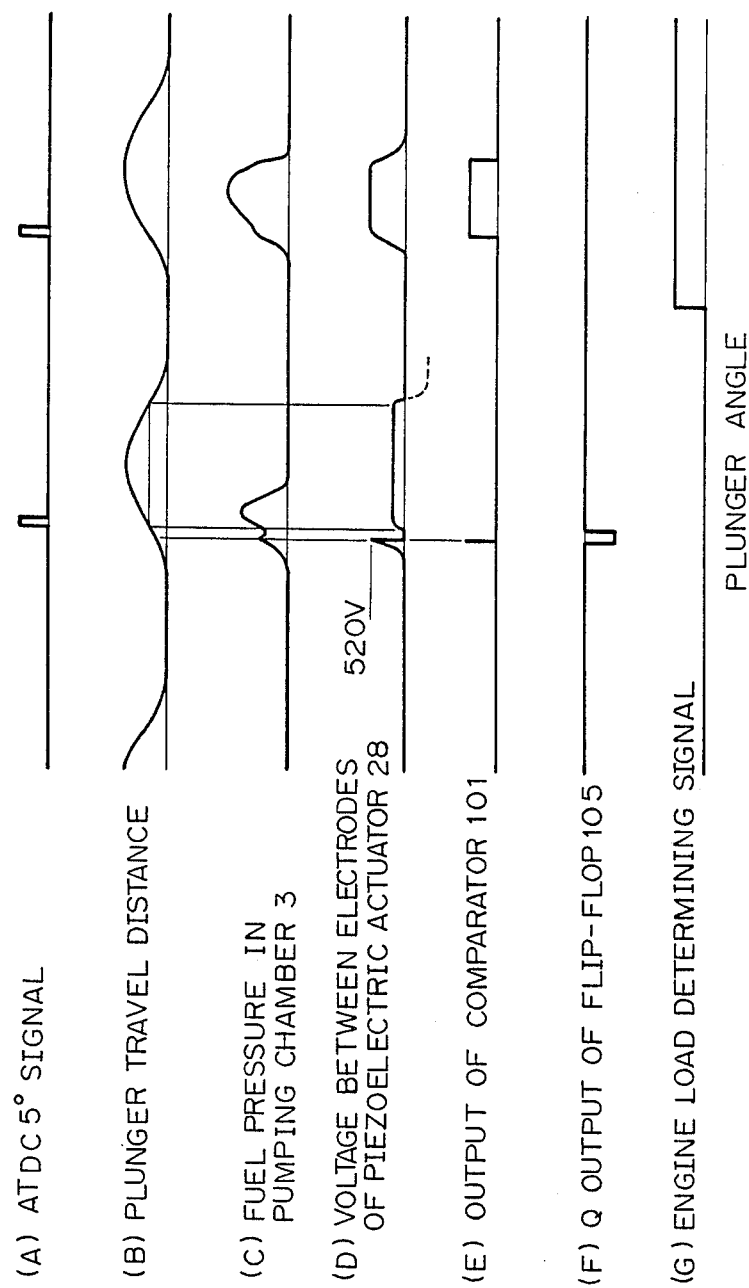

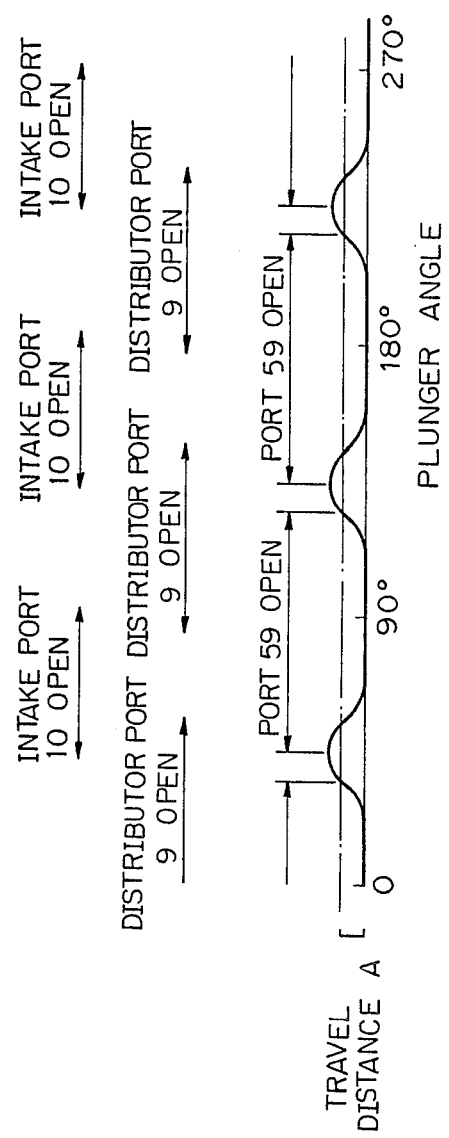

INTAKE STROKE

INITIAL STAGE OF DELIVERY STROKE

INTERMEDIATE STAGE OF DELIVERY STROKE

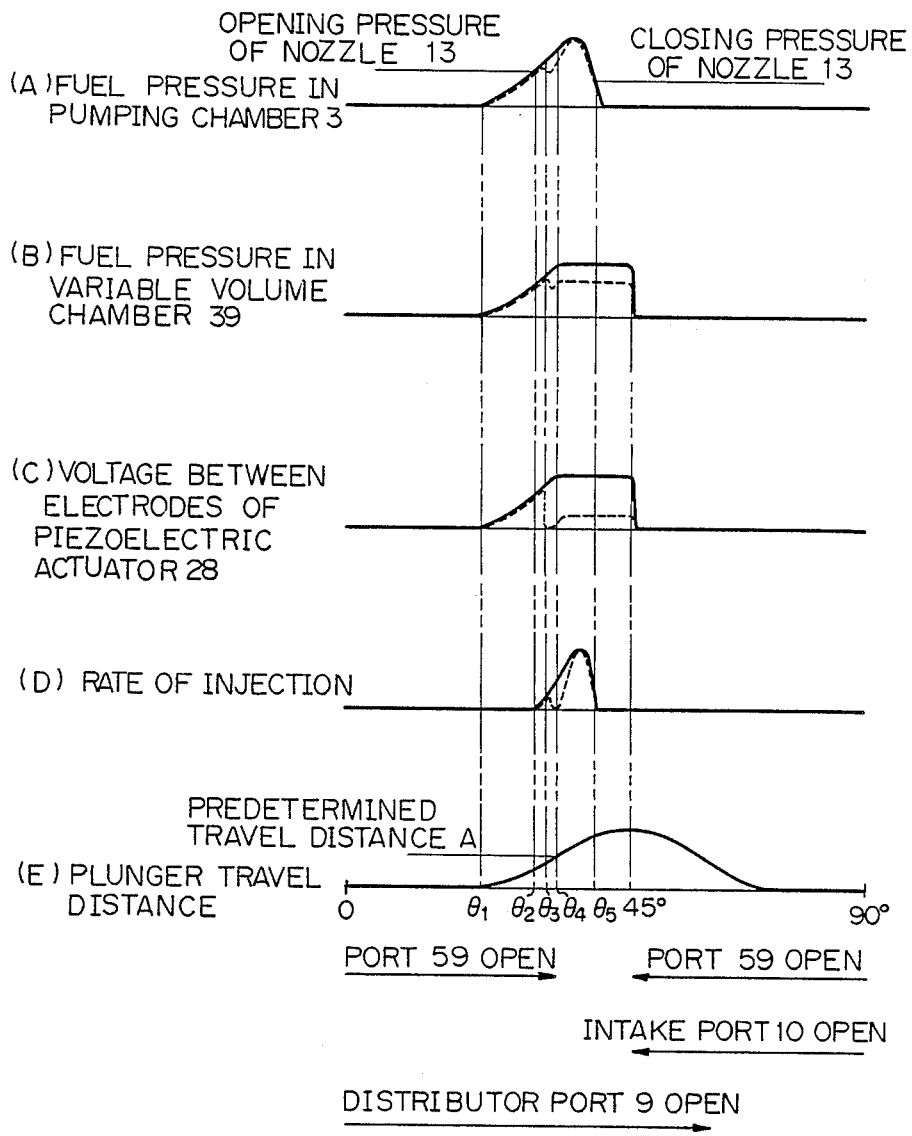

DIESEL ENGINE FUEL INJECTION SYSTEM WITH A RATE-OF-INJECTION CONTROL ARRANGEMENT

BACKGROUND OF THE INVENTION

1. Field of the Invention

The present invention relates to a fuel injection system for use in a diesel engine and, more particularly, to a fuel injection system having provisions for controlling the rate of injection of the system in accordance with varying operating condition of the engine.

2. Description of the Related Art

It is well known in the art that, during a light load, low speed operating condition such as idling of a diesel engine, the level of combustion noise and the amount of nitrogen oxide emissions may be effectively reduced by performing, for each fuel injection cycle, a small quantity fuel injection prior to a main injection pulse. This small quantity fuel injection pulse preceding the main injection pulse is commonly referred to as a pilot injection.

In the copending U.S. Pat. Application Ser. No. 754,750, filed July 15, 1985 and assigned to the assignee of the present invention, there is disclosed a fuel injection system having an arrangement adapted to control the rate of injection of the system in such a manner that a pilot injection is effected when the engine is operating under a light load low speed condition. This arrangement includes a variable volume chamber defined by a movable piston which is translated by an electronically controlled piezoelectric actuator having a stack of piezoelectric elements. The variable volume chamber is in permanent fluid communication with a pumping chamber of a fuel injection pump so that any pressure rise in the pumping chamber due to the delivery stroke of a pump plunger is reflected in the variable volume chamber. Fuel injection takes place in the following manner. As the delivery stroke of the pump plunger proceeds to increase the fuel pressure in the pumping chamber, the pressure in the variable volume chamber is concurrently increased, causing the piston to squeeze the piezoelectric stack of the actuator, thereby developing an electric potential across each piezoelectric element. When the fuel pressure in the pumping chamber reaches a predetermined value, a fuel injection nozzle opens to start fuel injection. Immediately thereafter, the piezoelectric actuator is controlled to discharge the accumulated electric potential, thereby allowing the piezoelectric stack to contract and permitting the piston to retract under the action of the fuel pressure in the variable volume chamber. This brings about a slight expansion of the volume of the variable volume chamber, causing the fuel pressure in the pumping chamber to be lowered below the opening pressure of the injection nozzle, whereby fuel injection ceases for a short period, thereby forming a pilot injection. As the delivery stroke of the pump plunger proceeds further, the fuel pressure in the pumping chamber is re-established so that a main injection takes places shortly after the pilot injection pulse. Control of the piezoelectric actuator may be performed in various other ways.

Although this arrangement is very effective in controlling the rate of injection, several problems have been encountered:

(1) Due to the small Young's modulus of the piezoelectric elements, the piezoelectric stack of the actuator undergoes unavoidable contraction during the main injection period. This limits the fuel pressure delivered by the injection pump and causes a reduction in the injection quantity and an extension in the injection period. These problems are particularly serious under a heavy load, high speed operating condition wherein the fuel pressure rises to about twice the pressure developed during the idling condition.

(2) Since the piezoelectric elements are repeatedly subjected to a high load due to the high fuel pressure in the variable volume chamber, there is a tendency for the elements to be degraded due to a loss of polarization.

(3) As the piezoelectric elements are compressed under an extremely high load and develop a high potential, it is necessary to design a drive circuit for driving the piezoelectric actuator in such a manner that is will sufficiently withstand a high voltage.

(4) The piezoelectric elements undergo a breakdown of voltage because a high voltage is developed across each element having a small thickness.

SUMMARY OF THE INVENTION

The object of the present invention is to overcome the foregoing problems and to provide a fuel injection system with a rate-of-injection control arrangement which is operable with a high reliability for an extended service life.

According to the invention, the fuel injection system is designed in such a manner that the pumping chamber of the injection pump is communicated, during the delivery stroke of the plunger, with the variable volume chamber only for the initial stage of the delivery stroke of the pump plunger. This is accomplished by controlling the fluid communication between the pumping chamber and the variable volume chamber by making use of the translational movement and/or rotational movement of the pump plunger. During the initial stage of the delivery stroke, a passage provides fluid communication between the pumping chamber and the variable volume chamber. During this stage, the piezoelectric actuator may be controlled to perform a pilot injection. After completion of the pilot injection, the pump plunger continues its delivery stroke to reach a position in which the fluid communication between the chambers is interrupted. In this stage, the variable volume chamber is hydraulically isolated from the pumping chamber so that the piezoelectric elements avoid the excessively high load to which they would otherwise be subjected during the subsequent main fuel injection period, wherein the fuel pressure in the pumping chamber is increased to a much higher level. Moreover, the isolation of the pumping chamber from the variable volume chamber enables the pump to operate at an optimal fuel delivery rate.

In one form of the invention, the passage providing fluid communication between the chambers opens directly into the pumping chamber and is positioned in such a manner that it is closed by the plunger head upon travel of the plunger through a predetermined distance.

In another form of the invention, a part of the passage is provided in the pump plunger and the remainder of the passage is arranged in such a manner that, during the delivery stroke of the plunger, it is brought into registered or overlapping relationship with the passage in the plunger only for the initial stage of the delivery stroke of the plunger.

In still another form of the invention, an intake port formed on the outer periphery of the plunger is used to release the fuel pressure in the variable volume chamber as soon as the main injection pulse is completed.

BRIEF DESCRIPTION OF THE DRAWINGS

FIGS. 5A, 5B, and 5C are enlarged cross-sectional views of a part of the injection pump shown in FIG. 1, wherein FIG. 5A shows the relative position of various parts during the intake stroke of the plunger, FIG. 5B shows the position thereof during the initial phase of the delivery stroke, and FIG. 5C shows the position thereof during the intermediate and terminal phases of the delivery stroke;

FIG. 6 is a composite representation in which the abscissa indicates the rotational angle of the pumping plunger, and wherein (A) shows the fuel pressure in the pumping chamber of the injection pump, (B) shows the fuel pressure in the variable volume chamber, (C) shows the voltage developed across one of the piezoelectric elements, (C') shows the condition of a circuit connecting the terminal electrodes of the piezoelectric elements, (D) shows the rate of injection of the system, and (E) shows the distance of travel of the pump plunger, with the timing of various ports being shown in the lower part of the figure;

FIG. 8 is a composite timing chart showing the operation of the control circuit shown in FIG. 7;

FIG. 15 is a timing chart showing the distance of travel of the plunger of the pump shown in FIG. 12 and showing the opening and closing timings of various ports, with respect to the rotational angle of the plunger;

FIGS. 16A through 16C are enlarged cross-sectional views of a part of the injection pump shown in FIG. 12, wherein FIG. 16A shows the relative position of various parts during the intake stroke of the pump plunger, FIG. 16B shows the position thereof during the initial stage of the delivery stroke of the plunger, and FIG. 16C shows the position thereof during the intermediate and terminal stages of the delivery stroke;

FIG. 19 is a composite representation showing variations in various parameters in the fuel injection system shown in FIG. 12, wherein (A) shows the fuel pressure in the pumping chamber, (B) shows the fuel pressure in the variable volume chamber, (C) shows the voltage developed across the piezoelectric element, (D) shows the rate of injection of the system, and (E) shows the distance of travel of the plunger; the abscissa indicating the rotational angle of the plunger and the timings of various ports being shown in the lower part. Throughout the drawings, equivalent parts and members are indicated by like reference numerals.

DESCRIPTION OF THE PREFERRED EMBODIMENTS

Figure 1:
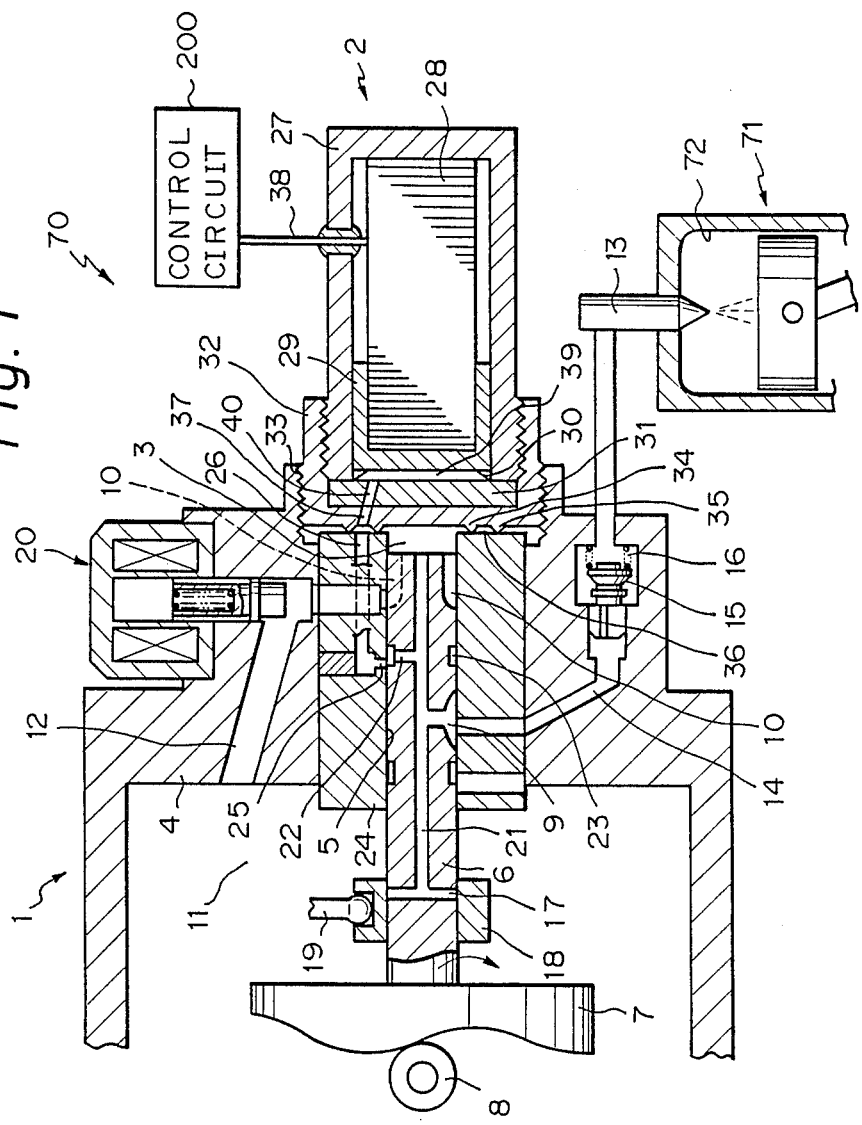
FIG. 1 is a cross-sectional view of a part of a fuel injection system according to a first embodiment of the present invention, wherein the fuel injection nozzle and the engine are illustrated in a highly diagrammatic form, and the pumping plunger is shown as being in the initial stage of a delivery stroke.

The first embodiment of the invention will be described with reference to FIGS. 1 through 10. Referring to FIG. 1, the fuel injection system 70 includes a rotary distributor type fuel injection pump 1, a rate-of-injection control device 2, and a plurality of fuel injection nozzles, only one of which is shown at 13 for simplicity. The injection nozzle 13 may be operatively mounted to the diesel engine 71 so that a high pressure fuel is spray injected into respective engine cylinders 72.

In the illustrated embodiment, the injection pump 1 is intended for a 4-cylinder engine. The injection pump 1 has a pump housing 4 supporting a pump cylinder 24 having a cylinder bore 5. A pump plunger 6 is closely fitted within the cylinder bore 5 for translational and rotational movement to define a pumping chamber 3. As is well known in the art, a drive shaft, not shown, of the pump is driven by the engine, in synchronization therewith and at a rotational speed of one half of the engine speed, through a conventional gear train or timing belt mechanism. The rotation of the drive shaft is transmitted to the plunger 6 through, for example, a spline coupling, to rotate the plunger conjointly therewith. Reciprocating movement of the plunger 6 is accomplished by a rotary cam 7 engaging a plurality of rollers, one of which is shown at 8 in FIG. 1. The rotary cam 7 is constantly urged into contact with the rollers 8 by a spring, so that a combined rotary and reciprocating movement of the plunger occurs as the cam 7 integral with the plunger 6 rotates with its cam surface engaging the rollers.

The pump housing 4 has an enclosed inner cavity 11 in which a fuel under a relatively low pressure of about 1.5 kg/cm$^2$ is fed via a fuel feed pump, not shown. An inlet passage 12 leads from the inner cavity 11 and opens into the inner wall of the cylinder bore 5. The plunger 6 has a plurality of intake ports 10 formed on the outer periphery of the head section of the plunger and spaced apart from each other at an equal angular distance; the number of intake ports corresponding to the number of engine cylinders. The low pressure fuel in the inlet passage 12 is drawn into the pumping chamber 3 when the plunger 6 moves on the intake stroke and one of the intake ports 10 is brought into registration with the inlet passage 12.

The plunger 6 has a central port 21 having an end opening into the pumping chamber 3. The other end of the central port 21 is merged into a diametrical passage serving to form ports 17, commonly referred to as spill control ports and opened and closed by a spill control ring 18, the axial position of which is controlled in a known manner by a control lever 19 in response to varying engine parameters such as engine load and revolutional speed through a conventional governer mechanism, not shown. The plunger 6 is also provided with a conventional fuel distributor port 9 which is communicated with the central port 21. The pump has a plurality of fuel distributor passages 14, the number of which is equal to the number of engine cylinders. Each distributor passage 14 is provided with a conventional delivery valve 15 urged in a closing direction by a spring 16. The delivery valve 15 serves as a check valve and as a suction valve. Each distributor passage 14 is connected through a high pressure fuel line to a fuel injection nozzle.

To briefly describe the operation of the injection pump 1, when the plunger 6 under the intake stroke moves to the left as viewed in FIG. 1, causing the pumping chamber 3 to expand, the low pressure fuel in the inner cavity 11 is drawn through one of the intake ports 10 into the pumping chamber 3. As the plunger 6 moves to the right to carry out a delivery stroke, the fuel in the pumping chamber 3 is pressurized to a high pressure and is distributed through the distributor port 9 to one of the passages 14 in communication with the port 9.

Delivery of the high pressure fuel begins upon commencement of the delivery stroke of the plunger 6 and terminates when the plunger 6 is moved to a position in which the spill control ports 17 are disengaged from the spill control ring 18, to release the high pressure fuel into the low pressure inner cavity 11. As is well known, the amount of fuel delivered may be varied by controlling the axial position of the spill control ring 18 through the lever 19, which is moved in response to the position of an accelerator pedal. A solenoid operated valve 20 serves to shut off the intake passage 12 when the engine is not running.

The rate-of-injection control device 2 will be described next. The control device 2 includes an inner casing 27 screwed into an outer casing 32, which is in turn screwed into the pump housing 4 by screw threads at 33. A spacer plate 31 is fluid tightly sandwiched between the outer and inner casings 32 and 27. The inner casing 27 slidably receives a piston 29 which cooperates with the inner casing 27 and the spacer plate 31 to define a variable volume chamber 39 therebetween. The inner casing 27 receives therein a piezoelectric actuator 28 which is operatively connected to the piston 29. A Belleville spring 30 mounted in the variable volume chamber 39 acts to urge the piston 29 into contact with the piezoelectric actuator 28.

The piezoelectric actuator 28 includes a stack of piezoelectric discs, numbering 50 in total, for example. Each piezoelectric disc has a diameter of about 15 mm and a thickness of about 0.5 mm. The discs are made from a piezoelectric ceramic material such as lead zirconate titanate (PZT). The discs are arranged alternately in opposite polarities and foil electrodes are interleaved between adjacent discs. These electrodes are connected alternately to a plus lead wire and a minus lead wire. The polarities of the piezoelectric discs and the interleaved electrodes are selected so that, upon application of a voltage of about 500 V across respective discs, each disc will expand for about 1 $\mu$m in the axial direction. Thus, the piezoelectric stack having 50 discs will exhibit a total expansion of about 50 $\mu$m by an application of 500 V between the plus and minus lead wires 38. The piezoelectric stack will contract to the original length by releasing the applied voltage or by applying a small level of reverse voltage. Alternatively, when the piezoelectric stack is squeezed in the axial direction, each piezoelectric disc will develop a voltage in proportion to the applied force. For example, each disc will generate a voltage of 500 V when subjected to a load of 500 kg. When the developed voltage is discharged under the squeezed condition of the discs by electrically connecting the plus and minus electrodes, then each disc will contract for about 1 $\mu$m. It will thus be understood that, when the piezoelectric stack of the actuator 28 is subjected to an axial load of 500 kg in response to the hydraulic pressure exerted on the piston 29, and if the electric circuit between the electrodes is closed thereafter, the piezoelectric actuator 28 will contract for about 50 $\mu$m. Control of the piezoelectric actuator 28, such as application of a voltage to the piezoelectric stack and closing and opening of the circuit connecting the electrodes, is effected by the control circuit 200 through the lead wires 38 as described later.

Expansion and contraction of the piezoelectric actuator 28 bring about the movement of the piston 29, which increases and reduces the volume of the variable volume chamber 39. The piston 29 is closely fitted within the inner casing 27 so as to prevent fuel in the variable volume chamber 39 from leaking toward the piezoelectric actuator 28.

According to the present invention, the fluid communication between the pumping chamber 3 and the variable volume chamber 39 in the illustrated embodiment is provided in the following manner. The spacer plate 31 has a passage 40 therethrough which is aligned with a passage 37 formed through the bottom wall of the outer casing 32. The passage 40 opens into the variable volume chamber 39 and the passage 37 opens into an annular space 36 defined between the end face of the pump cylinder 24 and the opposite face of the outer casing 32, and between two diametrically spaced annular sealing projections 34 and 35. The annular projections 34 and 35 are fluid tightly urged against the pump cylinder 24 to seal both the pumping chamber 3 and the annular space 36. Thus, the outer casing 32 also serves as an end plate for the pump cylinder 24. The pump cylinder 24 has an axial passage 26 with an end opening into the annular space 36. The other end of the passage 26 is merged with a radial port 25 opening into the cylinder bore 5.

Further, the pumping plunger 6 has a radial passage 22 opening at the inner end into the central port 21 and at the outer end into an annular groove 23 formed on the circumferential periphery of the plunger 6.

Figure 2:
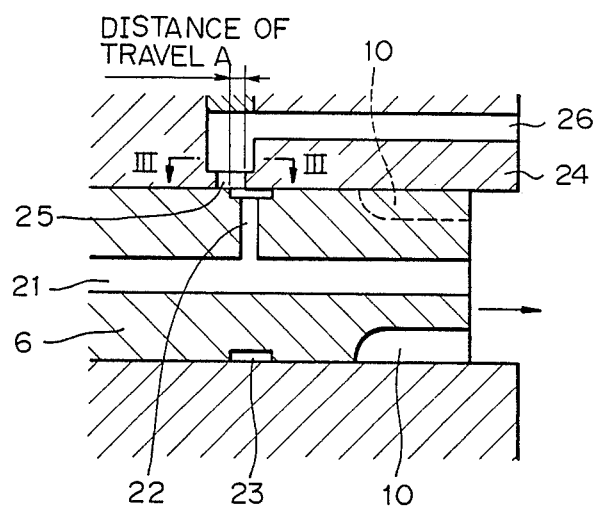
FIG. 2 is an enlarged cross-sectional view of a part of the fuel injection pump shown in FIG. 1.
Figure 3:
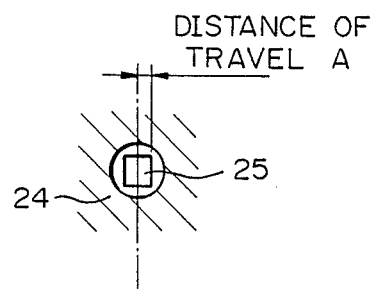
FIG. 3 is a cross-sectional view taken along the line III—III of FIG. 2.

As shown in FIG. 2, the relative positioning of the port 25 and the annular groove 23 is such that they are partly overlapped through a predetermined distance of travel A of the plunger, as measured from the bottom dead center position of the plunger. That is, the groove 23 and the port 25 are so positioned that, at the bottom dead center position of the plunger, the rear side wall of the annular groove is spaced rearwardly by a distance A from the forward edge of the port 25. As shown in FIG. 3, the port 25 has a rectangular cross section so that the forward edge thereof extends parallel to the rear side wall of the groove 23.

Figure 4:
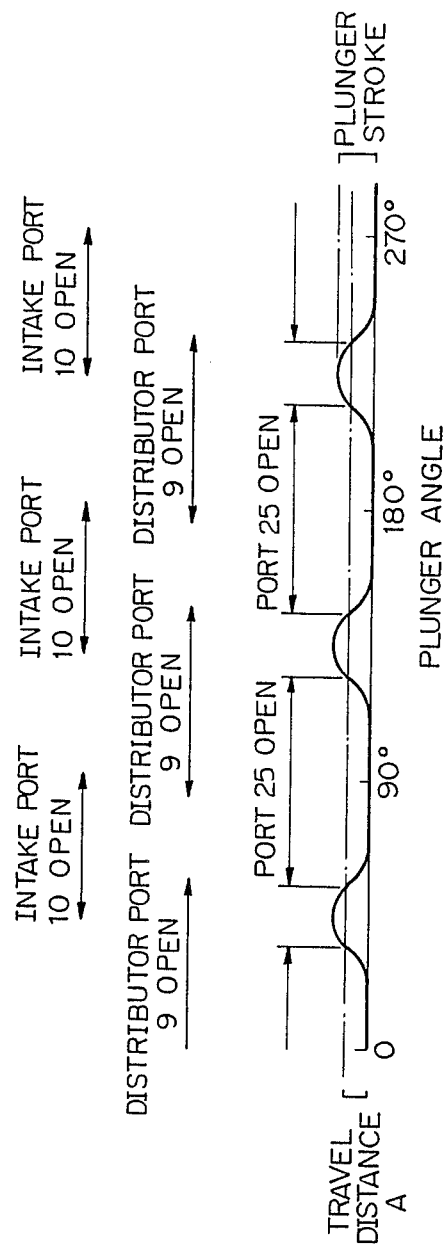
FIG. 4 is a timing chart showing the distance of travel of the pump plunger and showing the opening and closing timings of various ports, wherein the abscissa represents the rotational angle of the plunger.

The timing of the opening and closing of the intake port 10, the distributor port 9, and the port 25 in relation to the reciprocating and rotary movements of the plunger 6 will be described with reference to FIG. 4 and FIGS. 5A through 5C. In FIG. 4, the sinusoidal curve represents the variation in the distance of travel of the pump plunger 6 for the rotational angle of the plunger 6 caused by the rotary cam 7 engaging the rollers 8. In the illustrated embodiment, the injection pump 1 is intended for use in a 4-cylinder engine, and therefore, the plunger repeats one cycle of intake and delivery strokes for each 90° rotation of the plunger 6. The ports 9, 10 and 25 are kept opened, respectively, during the periods indicated by the arrows in FIG. 4. The intake stroke of the plunger 6 starts at the top dead center position of the plunger 6 and terminates when the plunger 6 reaches the bottom dead center position. The delivery stroke begins when the plunger 6 starts to lift from the bottom dead center position and terminates as it reaches the top dead center position. The distributor port 9, however, is kept opened for a longer period, and is closed at about 15° after the top dead center position.

The port 25 is kept opened when the distance of travel of the plunger 6 is less than the predetermined value A, and the port 25 is closed when the distance of travel becomes equal to or exceeds the value A. The predetermined distance of travel A is set to be slightly greater than the travel distance corresponding to the opening of the injection nozzle 13. The period indicated in FIG. 4 as the period in which the port 25 is opened, corresponds to the period in which the annular groove 23 is communicated with the port 25.

Figure 5A:
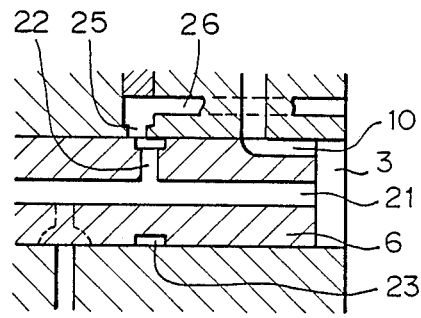
Figure 5B:
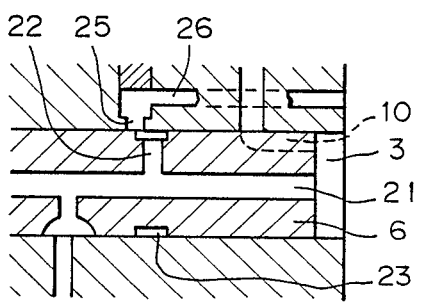

With the foregoing timing, during the initial stage of the delivery stroke of the pump plunger 6, in which the annular groove 23 becomes partly overlapped with the port 25 as shown in FIG. 5B, the fuel in the pumping chamber, which is pressurized to a relatively low pressure, is transmitted through the central port 21, the radial port 22, the annular groove 23, the port 25, the passage 26, the annular space 36, the passage 37, and the passage 40, to the variable volume chamber 39. When the plunger stroke proceeds and the plunger reaches the position shown in FIG. 5C, the port 25 in the pump cylinder 24 is closed by the plunger 6 so that the fluid communication between the pumping chamber 3 and the variable volume chamber 39 is interrupted. The port 25 is kept closed during the subsequent intermediate and terminal stages of the delivery stroke.

The operation of the fuel injection system according to the first embodiment of the invention will be readily understood when referring to FIG. 6. First, the operation of the system will be described with reference to the engine operating condition wherein the circuit between the electrodes of the piezoelectric actuator 28 is held electrically open, and thus the rate of injection of the system is not controlled. The fuel pressure in the pumping chamber 3, i.e., the delivery pressure of the injection pump, varies along the solid line shown at (A) in FIG. 6. The delivery period begins at the plunger angle $\theta_1$ shown at (E) in FIG. 6 and terminates at the angel $\theta_6$, at which the spill control ports 17 are released from the spill control ring 18. Fuel injection takes place at the plunger angle $\theta_2$, at which the delivery pressure exceeds the opening pressure of the injection nozzle 13, and the fuel injection terminates at the plunger angle $\theta_5$, at which the delivery pressure becomes lower than the closing pressure of the nozzle 13. During this injection period, a needle valve of the injection nozzle 13 lifts in proportion to the level of the delivery pressure, and thus the rate of injection through the injection nozzle 13 varies along the solid line shown at (D) in FIG. 6.

As mentioned before, during the delivery stroke of the plunger 6, the piezoelectric actuator 28 is subjected to the fuel pressure from the pumping chamber 3, only for the initial phase of the delivery stroke, i.e.,only the period in which the relative position of the annular groove 23 and the port 25 are as shown in FIG. 5B. The pressure variation appearing in the variable volume chamber 39 and the voltage developed between the plus and minus electrodes of the piezoelectric actuator 28 in response to the pressure rise in the chamber 39, may be understood from the graphs (B) and (C) of FIG. 6. During the intake stroke shown in FIG. 5A, the fuel in the pumping chamber 3 is not pressurized, so that the fuel pressure in the pumping chamber 3 is equal to the feed pressure, which is on the order of 1.5 kg/cm² when the engine is idling.

As the plunger 6 continues the delivery stroke, the fuel pressure in the pumping chamber 3 rises as shown at (A) in FIG. 6. During the initial stage of the delivery stroke, the port 25 is in communication with the pumping chamber 3 as shown in FIG. 5B, so that there is also a pressure rise in the variable volume chamber 39. The fuel pressure in the chamber 39 is applied to the piston 29 which squeezes the stack of piezoelectric elements of the actuator 28 thereby generating a voltage between the electrodes as shown by the solid line in the graph (C) of FIG. 6. The compressive force to which the piezoelectric elements are subjected may be obtained from the pressure in the variable volume chamber 39 multiplied by the pressure receptive area of the piston 29. Assuming that the pressure receptive area of the piston 29 is 4 cm² and that the injection nozzle 13 is set to open at a pressure of 120 kg/cm², the piezoelectric elements will be squeezed under a load of 480 kg, at the moment in which fuel injection begins at the plunger angle $\theta_2$. Accordingly, the voltage generated across the respective piezoelectric elements is 480 V.

Figure 5C:
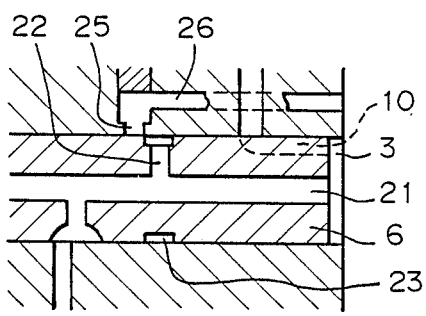

As the delivery stroke of the plunger 6 proceeds and the distance of travel of the plunger becomes the predetermined value A at the plunger angle $\theta_4$ as shown in FIG. 5C, the initial stage of the delivery stroke terminates and the fluid communication between the pumping chamber 3 and the variable volume chamber 39 is interrupted by the plunger 6 closing the port 25. During the subsequent intermediate stage of the delivery stroke, the pressure in the pumping chamber 3 is further increased thereby increasing the rate of injection. However, the pressure in the variable volume chamber 39 is kept constant during the subsequent stage, as shown at (B) in FIG. 6, because the port 25 is closed to hydraulically seal the variable volume chamber 39. Accordingly, the voltage developed in the piezoelectric actuator 28 is kept constant.

Operation of the fuel injection system will be described next with reference to the operating condition wherein the circuit between the electrodes of the piezoelectric actuator 28 is electrically closed at a controlled timing in order to control the rate of injection. The fuel pressure in the pumping chamber 3, the fuel pressure in the variable volume chamber 39, the voltage generated in the piezoelectric actuator 28, and the rate of fuel injection, under this condition, are shown in FIG. 6 by the broken lines.

The control circuit 200 operates to close the circuit between the electrodes of the piezoelectric actuator 28 at the plunger angle $\theta_3$ (FIG. 6 (C')) located between the angle $\theta_2$ at which fuel injection begins and the angle $\theta_4$ at which the distance of travel of the plunger 6 is equal to the predetermined value A and the port 25 is closed. As a result of the closure of the circuit, the voltage generated in the piezoelectric actuator 28 is discharged (FIG. 6 (C)). Where a voltage of 520 V has been developed in the piezoelectric actuator 28, then when the voltage is discharged, the piezoelectric stack of the actuator 28 will contract for 52 $\mu$m thereby causing the variable volume chamber 39 to expand for 4 cm$^2 \times$ 52 $\mu$m = 20.8 mm$^3$. As a result, the pressure in the pumping chamber 3 is lowered as shown by the broken line at (A) in FIG. 6, thereby causing the fuel injection to cease for a short period as shown by the broken line at (D) in FIG. 6. This will bring about a small injection pulse known in the art as the pilot injection.

The timing at which the electric circuit connecting the plus and minus electrodes is closed and opened is illustrated at (C') in FIG. 6. Closure and opening of the electric circuit is timed by the control circuit 200 in response to the rotational angle of the engine, as described later in detail.

The pressure in the pumping chamber 3, the pressure in the variable volume chamber 39, and the injection pressure, once lowered in response to the discharge of voltage in the piezoelectric actuator 28, then increase as the delivery stroke of the plunger 6 continues. When the port 25 is closed at the plunger angle $\theta_4$, however, the fuel in the variable volume chamber 39 is encased therein, so that the pressure in the chamber 39 is maintained thereafter at a value which is reached at the plunger angle $\theta_4$, as shown by the broken line at (B) in FIG. 6. Therefore, the voltage generated in the piezoelectric actuator 28 is kept constant at a reduced level, as shown by the broken line at (C) in FIG. 6.

After the delivery stroke is completed and as the plunger starts the intake stroke with the intake port 10 opened, the pressure in the pumping chamber 3 becomes equal to the feed pressure in the inner cavity of the pump housing. Then, the port 25 is opened at the plunger angle $\theta_7$, thereby allowing the pressure in the variable volume chamber 39 to drop to the feed pressure, as shown at (B) in FIG. 6. This, in turn, causes the voltage drop in the piezoelectric actuator 28 as shown at (C) in FIG. 6.

It is desirable that the above-mentioned control of the rate of injection by the control device 2 be stopped during the heavy load and high speed condition of the engine. This may be effected by disabling the operation of the control circuit 200 in response to a detected engine load and speed.

The structure and operation of the control circuit 200 will be described with reference to FIGS. 7 and 8.

Figure 7:
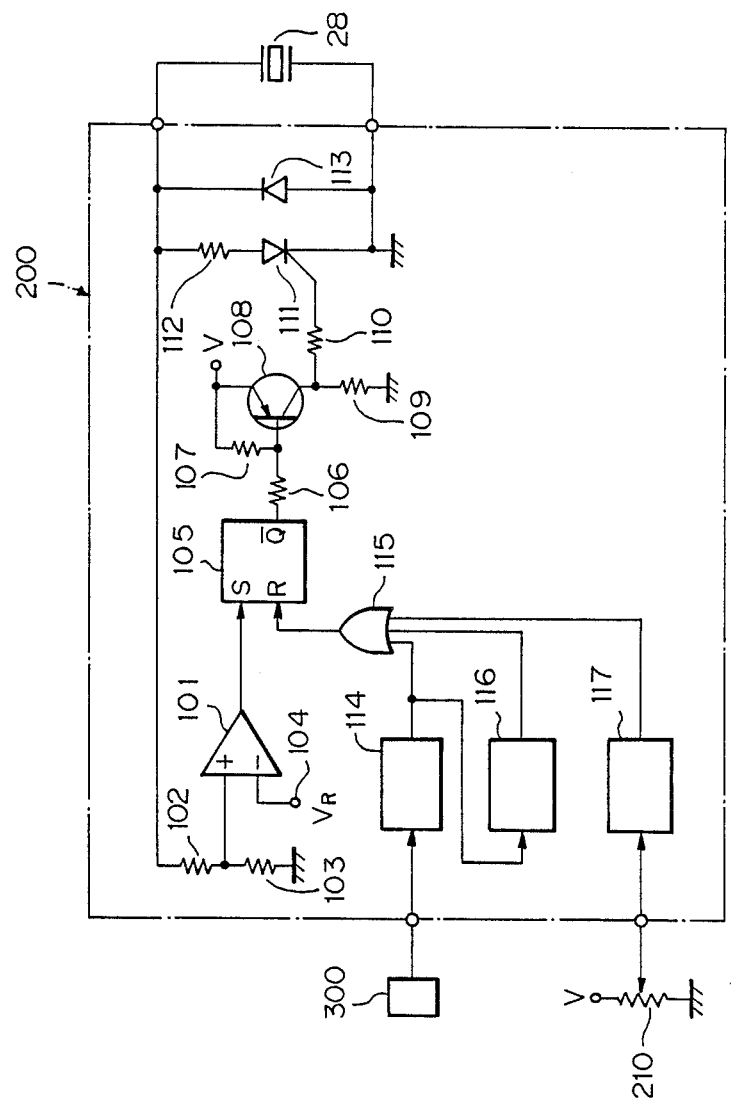
FIG. 7 is a block diagram of a control circuit for the piezoelectric actuator.

Referring to FIG. 7, the control circuit 200 includes a comparator 101. The voltage developed at the electrodes of the piezoelectric actuator 28 is divided by resistors 102 and 103, and the divided voltage is applied to the non-inverting input of the comparator 101. The inverting input of the comparator 101 receives a reference voltage 104. The comparator 101 is designed to issue a "1" level signal when the voltage at the piezoelectric actuator 28 becomes equal to or greater than 520 V.

The output of the comparator 101 is connected to the set input of a flip-flop 105, which is designed to be preferentially operated by a reset signal so that it issues a "1" level signal to the Q output thereof when a "1" level signal is applied to the reset input. The Q output is "0" level only when the reset input is "0" and the set input is "1". The output signal from the flip-flop 105 is applied through resistors 106 and 107 to the base electrode of a transistor 108 to turn the transistor 108 ON and OFF. The collector electrode of the transistor 108 is grounded through a resistor 109 and is connected through a resistor 110 to the gate input of a thyristor 111.

The thyristor 111 is connected in parallel with the piezoelectric actuator 28 and in series with a resistor 112 having a small resistance. The thyristor 111 is turned ON to discharge the voltage generated in the piezoelectric actuator 28, when a "1" level signal is applied to the gate input. A diode 113 is also connected in parallel with the piezoelectric actuator 28. The anode of the diode 113 is grounded, and the cathode thereof is connected to the high tension side. The diode 113 serves to prevent a reverse voltage from being applied to the piezoelectric actuator 28 and to promote expansion of the piezoelectric stack by supplying thereto electrostatic charges when the load imposed on the piezoelectric actuator 28 is decreased.

A rotational speed sensor 300 consisting, for example, of a magnetoresistive element (MRE), issue a signal for each crank angle of 5° after the top dead center (ATDC) for each cylinder of the engine. Output signals from the speed sensor 300 are input to a waveshaping circuit 114 which issues a "1" level pulse for each crank angle of ATDC 5° at each cylinder. The output from the waveshaping circuit 114 is applied to one input of a 3-input OR gate 115. Since the 3-input OR gate 115 is connected to the reset input of the flip-flop 105, when one input to the 3-input OR gate 115 is at the "1" level, the flip-flop 105 is reset so that the Q output thereof is at the "1" level, thereby turning OFF the thyristor 111.

The output of the waveshaping circuit 114 is also connected to an engine speed determining circuit 116, which issues a "1" level signal when the engine speed is equal to or higher than 1,200 rpm and a "0" level signal when the speed is lower than 1,200 rpm. The signal from the engine speed determining circuit 116 is applied to the 3-input OR gate 115.

A potentiometer 210 linked for conjoint movement to an accelerator pedal issues a voltage signal having a value proportional to the engine load. The voltage signal is applied to an engine load determining circuit 117 which delivers a "1" level signal when the accelerator opening is equal to or greater than 20% and delivers a "0" level signal when the opening is lower than 20%. The output signal from the circuit 117 is also applied to the 3-input OR gate 115.

The operation of the control circuit 200 will be readily understood when referring to the timing chart shown in FIG. 8. The control circuit 200 controls the piezoelectric actuator 28 in such a manner that, depending on the engine operating condition, the fuel injection system is operated either in a "pilot injection" mode, wherein the rate of injection of the system is controlled, or in a usual mode wherein the rate of injection is not controlled.

Referring first to the pilot injection mode, the control circuit 200 operates in the following manner when the engine is operating under a low speed, light load condition. In response to the rotation of the drive shaft of the injection pump 1, the pump plunger 6 performs its delivery stroke as shown at (B) in FIG. 8, thereby increasing the fuel pressure in the pumping chamber 3 as shown at (C) in FIG. 8. Accordingly, the stack of piezoelectric elements of the piezoelectric actuator 28 is compressed to generate a voltage as shown at (D) in FIG. 8. The generated voltage is divided by the resistors 102 and 103 and the comparator 101 compares the divided voltage with the reference voltage. When the voltage generated in the piezoelectric actuator 28 exceeds 520 V, the output from the comparator 101 is at the "1" level (FIG. 8, at (E)) so that the flip-flop 105 is inverted to issue a "0" level signal from the Q output (FIG. 8, at (F)). Since the Q output is applied through the resistor 106 and 107 to the transistor 107, to turn it ON, the thyristor 111 is triggered and is turned ON, thereby closing the electric circuit connecting the electrodes of the piezoelectric actuator 28. As a result, the electrostatic charges accumulated at the electrodes are discharged and the voltage developed between the electrodes drops to zero volt, thereby allowing the piezoelectric stack to contract, whereby the fuel pressure in the pumping chamber 3 is reduced (FIG. 8 at (C)) causing the fuel injection to cease as mentioned before. As the delivery stroke of the pump plunger 6 proceeds, the pump 1 continues the delivery of fuel so that the pressure in the pumping chamber 3 is again increased, thereby resuming the fuel injection (FIG. 8, at (C)).

Note, the thyristor 111 remains turned ON until the flip-flop 105 is reset.

Thereafter, when the crank angle reaches ATDC 5°, the rotational speed sensor 300 issues a signal which is shaped by a waveshaping circuit 114 into a pulse signal (FIG. 8, at (A)) which is applied through the 3-input OR gate 115 to the flip-flop 105, whereby the flip-flop 105 is reset to issue a "1" level signal from its Q output (FIG. 8, at (F)) thereby turning OFF the thyristor 111. As a result, the circuit connecting the electrodes of the piezoelectric actuator 28 is made open.

As the delivery stroke proceeds further, the pressure in the pumping chamber 3 is further increased. When the port 25 is closed, however, to isolate the variable volume chamber 39 from the pumping chamber 3, the pressure in the variable volume chamber 39 is limited to a level which is developed at the time of closure of the port 25, as shown at (B) in FIG. 6, so that the voltage generated between the electrodes of the piezoelectric actuator 28 is also limited to a low value (FIG. 8, at (D)).

Thereafter, the spill control ports 17 are opened before the pump plunger 6 reaches the top dead center position, so that the fuel pressure in the pumping chamber 3 is released to thereby terminate the fuel injection.

As the intake stroke of the plunger 6 begins, the low pressure fuel in the inner cavity 11 of the pump housing 4 is introduced through the intake port 10 into the pumping chamber 3. When the plunger 6 stroke continues further to reopen the port 25, then the variable volume chamber 39 is communicated with pumping chamber 3, thereby allowing the relatively high pressure in the variable volume chamber 39 to be released toward the pumping chamber 3, whereby the voltage developed in the piezoelectric actuator 28 is lowered. At this moment, the voltage tends to drop to a negative value, as shown by the broken line at (D) in FIG. 8. If the negative voltage reaches a high value, there is a danger that the polarization of the piezoelectric elements will be lost. The diode 113 serves to protect the piezoelectric elements from such a loss of polarization. That is, the diode 113 acts to discharge the negative voltage and to supply the piezoelectric elements with electrostatic charges, to promote an expansion of the piezoelectric actuator 28.

Operation of the control circuit 200 in the usual mode is as follows. When the engine is operating, for example, under a heavy load, the potentiometer 210 delivers a high output voltage so that the engine load determining circuit 117 issues a "1" level signal when the engine load becomes equal to or greater than a predetermined value (FIG. 8, at (G)). The signal from the circuit 117 is sent through the 3-input OR gate 115 into the flip-flop 105, whereby the flip-flop 105 is reset. That is, the flip-flop 105 is reset whenever the engine load is greater than the preset value, so that, regardless of presence or absence of a setting signal from the comparator 101, the thyristor 111 is turned OFF, thereby maintaining the circuit between the electrodes of the piezoelectric actuator 28 in an open state. A similar operation is achieved when the engine is operating at a high revolutional speed. Namely, the engine speed determing circuit 116 determines the engine speed in accordance with the signals from the rotational speed sensor and delivers a "1" level signal when the engine speed is equal to or greater than a preset value, whereby the flip-flop 105 is reset to maintain the circuit connecting the electrodes of the piezoelectric actuator 28 in an open state.

As above mentioned, the control circuit 200 is designed to open the piezoelectric circuit at a predetermined timing. However, the control circuit 200 may have a different structure as long as an equivalent function is performed.

As will be understood from the foregoing, the fuel injection system according to the first embodiment of the invention is controlled by simply discharging the electrostatic charges generated in the piezoelectric actuator 28, without applying a voltage thereon.

It should be noted that the variable volume chamber 39 is communicated with the pumping chamber 3 during the delivery stroke of the pump plunger 6 only for a initial stage required to perform the pilot injection. During the subsequent stage of the delivery stroke, wherein the pumping chamber 3 develops a higher pressure, the variable volume chamber 39 is disconnected from the pumping chamber 3 to prevent the piezoelectric actuator 28 from being subjected to an excessively high load. Therefore, it is possible to solve the problems of degradation of the piezoelectric elements, formation of cracks in the elements, breakdown of the elements due to a high voltage, and leakage of fuel from the control device 2.

In addition, the form of the fuel injection is improved. This will be described with reference to FIGS. 9A through 9C.

Figure 9A:
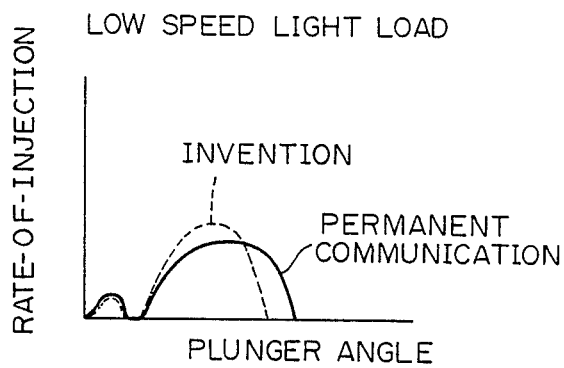
FIGS. 9A through 9C are graphs showing the variations in the rate of injection of the fuel injection system according to the invention, and of another fuel injection system wherein the variable volume chamber is in permanent fluid communication with the pumping chamber.
Figure 9B:
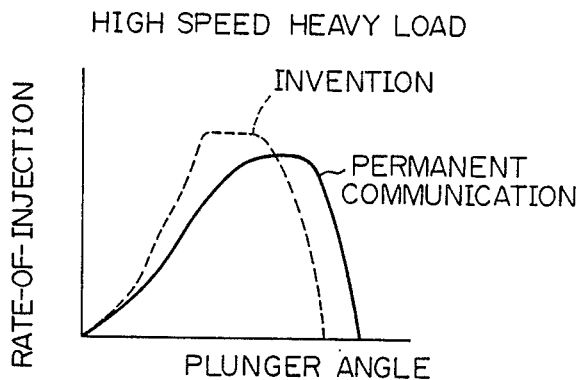
Figure 9C:
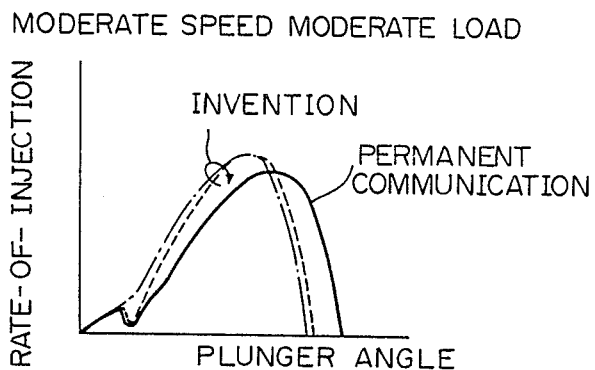

FIG. 9A shows the rate-of-injection pattern during the low speed light load condition of the engine, in which the broken line indicates the rate-of-injection pattern obtained by the fuel injection system according to the invention, and the solid line indicates the rate-of-injection pattern obtained with a fuel injection system wherein the variable volume chamber 39 is in permanent communication with the pumping chamber 3; FIG. 9B illustrates the rate-of-injection pattern during the high speed heavy load condition, in which the broken line shows the rate-of-injection pattern according to the invention, and the solid line shows a similar pattern obtained with the system wherein the variable volume chamber 39 is in a permanent fluid communication with the pumping chamber 3; and FIG. 9C shows the rate-of-injection pattern during a moderate speed moderate load condition, in which the broken line indicates the rate-of-injection pattern obtained according to the invention operated optionally in the pilot injection mode, in which chain line indicates the rate-of-injection pattern obtained according to the invention operated in the usual non-pilot-injection mode, and the solid line indicates the rate-of-injection pattern obtained by the injection system wherein the variable volume chamber 39 is permanently connected with the pumping chamber 3. It will be noted from FIGS. 9A through 9C that the maximum rate of injection in the injection system wherein the variable volume chamber 39 is permanently communicated with the pumping chamber 3 is less than the maximum rate of injection obtained in the system according to the invention. This means that, when the amount of fuel delivered by the injection pump 1 is the same, the injection quantity through the injection nozzles is reduced in the case where the variable volume chamber 39 and the pumping chamber 3 are permanently connected. Therefore, the injection pump 1 must be modified to deliver an increased output in order to maintain the same injection quantity.

The reduction in injection quantity occurs because the Young's modulus of the piezoelectric elements is smaller than that of the steel material forming the variable volume chamber 39 and the pumping chamber 3. This reduced injection quantity would have the following adverse effects on the engine performance; a reduced output of the engine, increased fuel consumption, and increased hydrocarbon emissions, as a result of an increase in the fuel injection period; and an increase in the smoke formation during a high speed heavy load operation.

In contrast, according to the invention, the variable volume chamber 39 is not subjected to a high pressure in the pumping chamber 3 once the port 25 is closed to interrupt communication between the variable volume chamber 39 and the pumping chamber 3. Therefore, the problem caused by the low Young's modulus of the piezoelectric elements is avoided. Thus, according to the invention, a high injection quantity is maintained and the fuel injection takes place within a shorter injection period, as apparent from FIGS. 9A through 9C. It will be noted from the broken line in FIG. 9C that, during a moderate speed condition, the rate of injection is relatively high even though the system is operated in the pilot injection mode. This is because the time period during which the port 25 is made open is relatively short during the moderate speed operation.

Figure 10A:
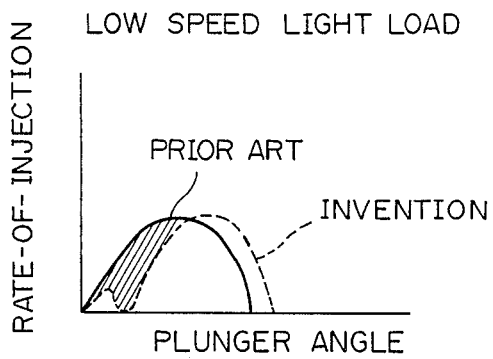
FIGS. 10A through 10C are graphs showing variations in the rate of injection of the fuel injection system according to the invention, and of the conventional fuel injection system without a rate-of-injection control arrangement.
Figure 10B:
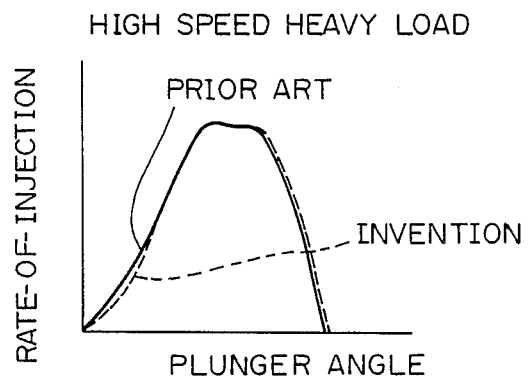

The advantages of the invention over the conventional fuel injection systems without a rate-of-injection control device will be described with reference to FIGS. 10A through 10C. The broken lines in FIGS. 10A through 10C indicate the rate of injection obtained in the system according to the invention, and the solid lines represent the rate of injection in a conventional system without the rate-of-injection control. FIG. 10A corresponds to the low speed light load condition of the engine; FIG. 10B corresponds to the high speed heavy load condition; and, FIG. 10C corresponds to the moderate speed moderate load condition.

As shown in FIG. 10A, during the low speed light load condition, a pilot injection pulse is formed for each fuel injection cycle according to the invention. This makes a considerable contribution to a reduction of combustion noise. It will be noted that the injection system according to the invention does not substantially undergo a reduction of the maximum rate-of-injection, so that the injection period is not excessively extended. The reduction in the injection quantity per cycle due to the pilot injection and shown by the hatched lines may be compensated by adjusting the injection pump 1 in such a manner that the fuel delivery amount is correspondingly increased by advancing the timing of the pump 1 and by retarding the timing at which the spill control ring 18 releases the spill control ports 17.

During the high speed heavy load operation as shown in FIG. 10B, the rate-of-injection in the system according to the invention is slightly reduced as compared with the conventional system, as the port 25 is opened to connect the pumping chamber 3 with the variable volume chamber 39. It will be noted that the rate of injection is not excessively reduced because the communication between the chambers 3 and 39 is limited to a short time period due to a high speed operation of the engine.

Figure 10C:
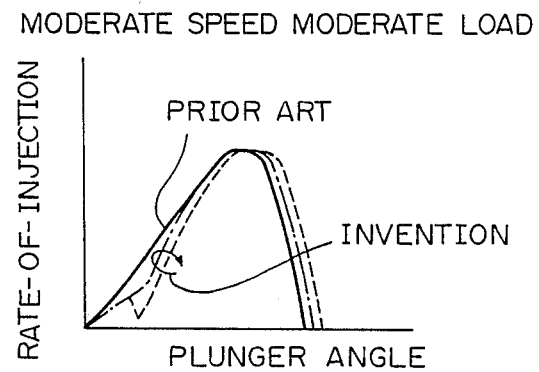

Under the moderate speed moderate load condition, the rate of injection is lower than that during the high speed operation, as shown by the chain line in FIG. 10C, when the circuit between the electrodes of the piezoelectric actuator 28 is made open. This reduction does not, however, substantially affect the engine performance. When the piezoelectric actuator 28 is controlled to perform a pilot injection, the injection period is not excessively prolonged, as shown by the broken line in FIG. 10C, so that is it possible to reduce the hydrocarbon emissions in the exhaust gas while at the same time reducing the amount of nitrogen oxides emissions.

Figure 11:
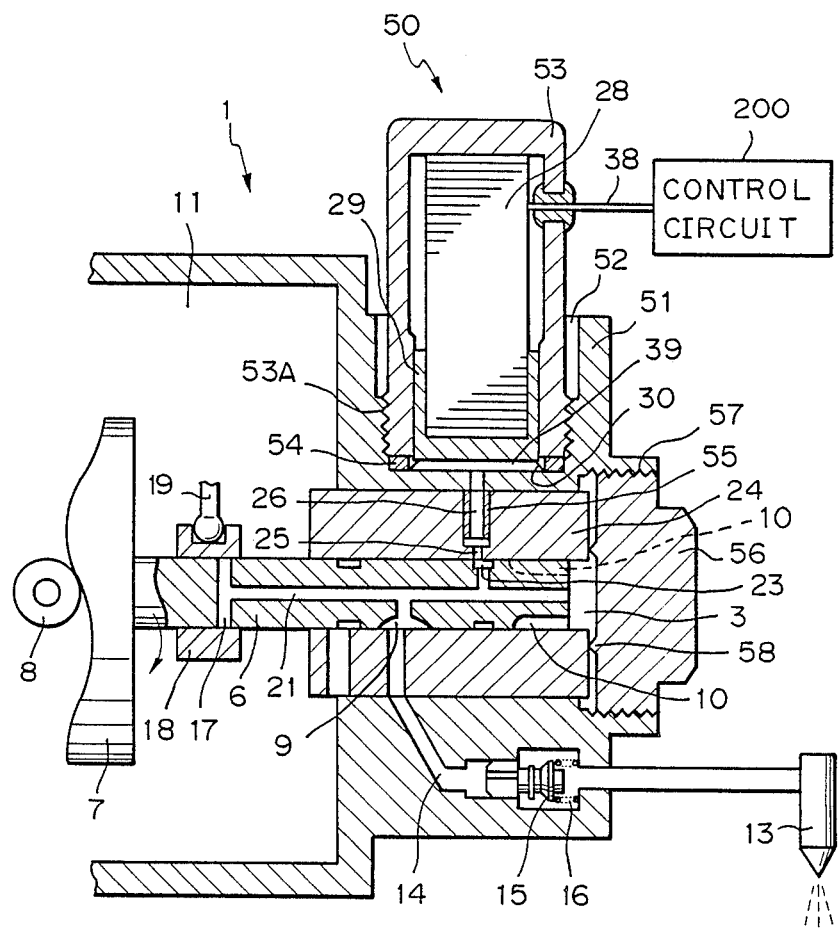
FIG. 11 is a cross-sectional view of a part of the fuel injection system according to a second embodiment of the invention.

A second embodiment of the present invention will now be described with reference to FIG. 11. The second embodiment differs from the first embodiment in that, in the first embodiment the rate-of-injection control device 2 is arranged coaxially with and opposite to the pumping plunger, but in the second embodiment, the rate-of-injection control device 50 is placed perpendicular to the pump plunger 6. This arrangement provides easier access to and maintenance of the rate-of-injection control device 50.

The control device 50 is mounted at a recess 52 formed in the pump housing 51. The control device 50 has a casing 53 which receives a piezoelectric actuator 28, a piston 29, and a sealing member 54 sandwiched between the lower part of the casing 53 and the bottom of the recess 52. The casing 53 is fastened to the pump housing 51 by screw threads shown at 53A.

A variable volume chamber 39 is defined between the lower surface of the piston 29 and the bottom of the recess 52. A Belleville spring 30 is arranged within the chamber 39 to urge the piston 29 into pressure contact with the piezoelectric actuator 28.

The pump cylinder 24 has a passage 26 and a port 25 similar to the first embodiment. As in the first embodiment, the port 25 and the annular groove 23 in the plunger 6 are arranged in such a manner that, during the delivery stroke of the plunger 6, the variable volume chamber 39 is communicated with the pumping chamber 3 only for the initial stage of the delivery stroke.

A bushing 55 is press-fitted into the passage 26 to reduce an unnecessary volume thereof.

An end plug 56 is screwed into the pump housing 51 by way of screw threads shown at 57, until an annular projection 58 is fluid tightly urged against the end face of the pump cylinder 24 to seal the pumping chamber 3.

The second embodiment operates in substantially the same manner as the first embodiment, and therefore, description thereof will be omitted.

A third embodiment of the invention will be described with reference to FIGS. 12 through 19.

Figure 12:
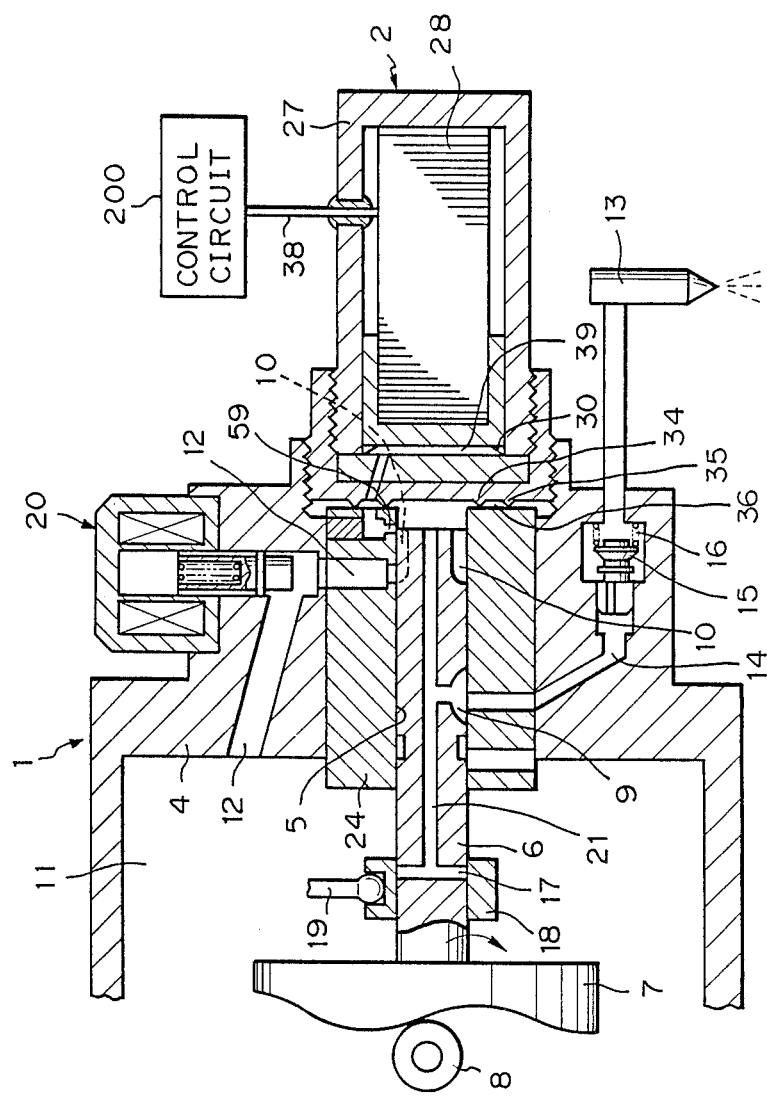
FIG. 12 is a cross-sectional view of a part of the fuel injection system according to a third embodiment of the invention.

The third embodiment differs from the first and the second embodiments in that, as shown in FIG. 12, a port 59 which is opened and closed in response to the movement of the pump plunger 6 is located at a different position, and that the plunger 6 is not provided with the annular groove 23 as in the first and the second embodiments. The rate-of-injection control device 2 is the same as in the preceding embodiments.

Figure 13:
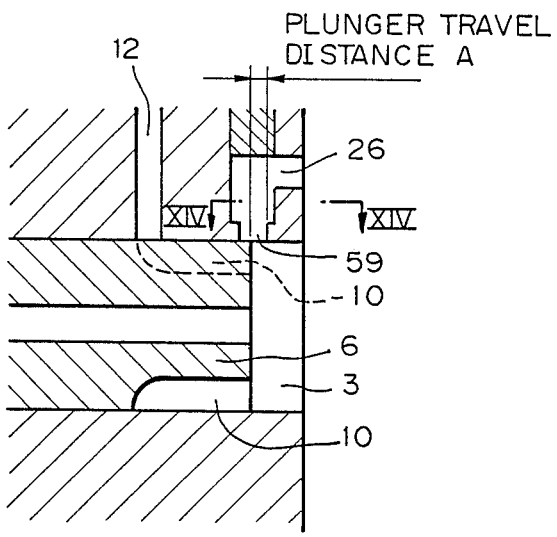
FIG. 13 is an enlarged cross-sectional view of a part of the injection pump shown in FIG. 12.
Figure 14:
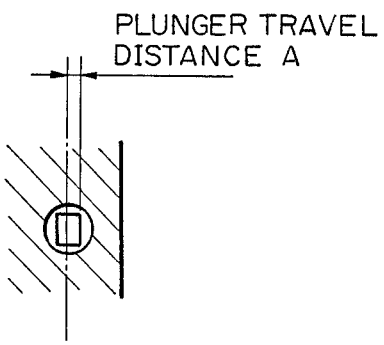
FIG. 14 is cross-sectional view taken along the line XIV—XIV of FIG. 13.

The position and configuration of the port 59 will be described with reference to FIGS. 13 through 15. In FIG. 13, the plunger 6 is shown as being in the bottom dead center position. As shown in FIG. 14, the port 59 has a rectangular cross-section. As shown in FIGS. 13 and 14, the port 59 is located at an axial position such that, with respect to the axial direction of the cylinder bore 5, the port 59 is closed by the head of the plunger 6 when the plunger 6 has moved through the predetermined distance of travel A. The circumferential position, with respect to the rotational movement of the plunger 6, of the port 59 is roughly equal to that of the intake port 12.

Referring to FIG. 15, the intake port 10 and the distributor port 9 are positioned so that they are opened and closed in the same manner as in the first embodiment. With reference to the port 59, during the delivery stroke of the plunger 6, the port 59 is closed by the head of the plunger 6 when the plunger 6 has moved through the predetermined travel distance A, as in the first embodiment. However, the third embodiment differs from the first embodiment in that, although in the first embodiment the port 25 is reopened only after the plunger 6 is returned to the position at which the distance of travel from the bottom dead center position becomes equal to the predetermined value A, the port 59 is reopened when the plunger 6 is rotated to an angular position such that the intake port 10 is brought into registration with the port 59 before the plunger 6 is returned to the position at which the travel distance is equal to A. The reopening of the port 59 takes place at roughly the same time as that at which the intake port 10 is brought into communication with the intake passage 12. In summary, in the first and second embodiments, the port 25 is closed and opened in response to the axial movement of the plunger 6, whereas in the third embodiment, the port 59 is closed in response to the axial movement of the plunger 6 and is opened in response to the rotational movement of the plunger 6.

The operation of the third embodiment will be described with reference to FIGS. 16 through 19.

Figure 16A:
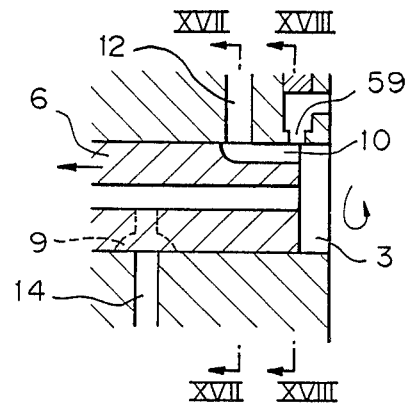
Figure 17A:
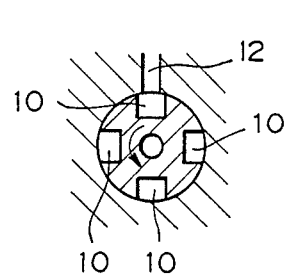
FIGS. 17A through 17C are cross-sectional views taken along the line XVII—XVII of FIG. 16A and corresponding respectively to FIGS. 16A through 16C.
Figure 18A:
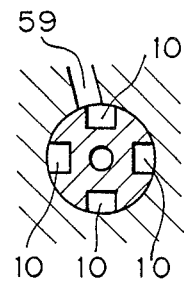
FIGS. 18A through 18C are cross-sectional views takes along the line XVIII—XVIII of FIG. 16A and corresponding respectively to FIGS. 16A through 16C.

When the plunger moves in the intake stroke as shown in FIG. 16A, the pumping chamber 3 is communicated with the port 59 and through the intake port 10 with the intake passage 12 as shown in FIGS. 17A and 18A. At this moment, there is no communication between the distributor port 9 and the distributor passage 14.

Figure 16B:
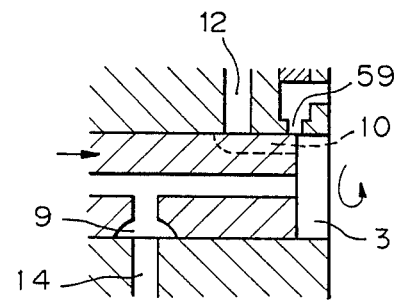
Figure 17B:
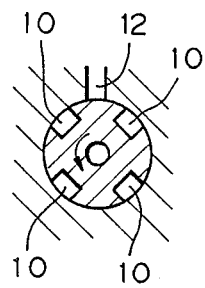
Figure 17C:
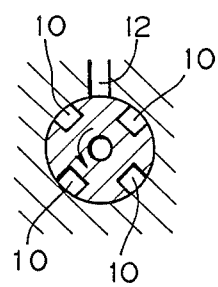

When the plunger 6 is moved in both rotational and translational movements to perform the initial stage of the delivery stroke, as shown in FIG. 16B, the intake port 10 is moved away from the intake passage 12 as shown in FIG. 17B and the distributor port 9 is brought into registration with the distributor passage 14. At this stage, the plunger is in an angular position such that the port 59 is spaced angularly from the intake port 10 but the plunger 6 is in an axial position such that the pumping chamber 3 is in direct communication with the port 59, because the port 59 is not closed by the head of the plunger 6. During this initial stage of the delivery stroke, the piezoelectric actuator 28 is controlled to perform a pilot injection.

Figure 16C:
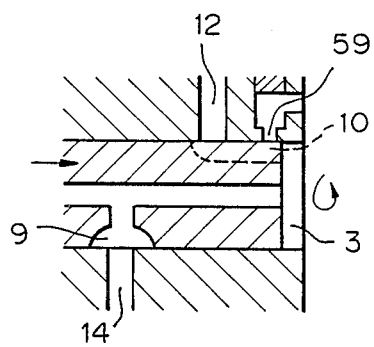
Figure 18B:
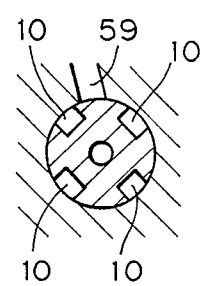
Figure 18C:
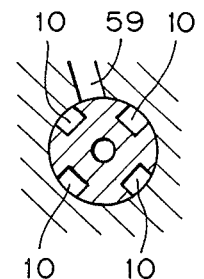

As the translational and rotational movements of the plunger 6 proceed further, to reach the position shown in FIG. 16C representing the intermediate stage of the delivery stroke, the intake port 10 is disconnected from the intake passage 12 (FIG. 17C) and the port 59 is closed by the head of the plunger 6 (FIG. 16A) and is isolated from the intake port 10 (FIG. 18C). Thus, the port 59 is isolated from the pumping chamber 3 and communication between the variable volume chamber 39 and the pumping chamber 3 is interrupted.

The operation of the third embodiment will be readily understood when referring to FIGS. 19A through 19E. In FIGS. 19A through 19D, the broken lines indicate variations in certain parameters that occur when the system is operated in the pilot injection mode, and the solid lines indicate those occurring in the usual non-pilot injection mode. The third embodiment operates in substantially the same manner as in the first embodiment described with reference to FIGS. 6A through 6E, except that the port 59 is opened at an earlier time concurrently with the opening of the intake port 10. That is, at a plunger angle of 45°, the intake port 10 is communicated with the intake passage 12 and the pump plunger 6 starts an intake stroke. Simultaneously therewith, the port 59 is brought into an overlapping relationship with the intake port 10 so that the variable volume chamber 39 is communicated with the pumping chamber 3, which is now under the feed pressure. Thus, the fuel pressure in the variable volume chamber 39 is released at a much earlier time than in the first embodiment, in which the pressure drop in the variable volume chamber 39 occurs only at the plunger angle $\theta_7$ as shown in FIGS. 6B, 6C and 6E. In this manner, the period in which the piezoelectric elements of the piezoelectric actuator 28 are subjected to a relatively high fuel pressure in the variable volume chamber 39 is further shortened. Operation of the system in other respects is the same as that in the first embodiment, and accordingly, a description thereof will be omitted.

It will be noted that, in the third embodiment, the rate-of-injection control device 2 may be arranged perpendicular to the axis of the pump plunger 6, as in the second embodiment, without changing the position of the port 59.

Although the present invention has been described herein with reference to specific embodiments thereof, it should be understood that various changes and modification may be made therein without departing from the spirit of the invention. For example, the port 25/59 has been described as having a rectangular cross-section, but other cross-sectional configurations such as a slot-like or circular cross-section may be readily apparent to those skilled in the art.

Also, the rate-of-injection control device 2/50 has been illustrated as mounted outside of the pump housing 4. The control device 2/50, however, may be mounted within the pump housing 4.

Similarly, although the control circuit 200 has been described as being designed to determine the timing of contracting the piezoelectric actuator 28 according to the voltage generated in the actuator 28, this timing may be determined according to signals representative of the rotational angle of the pump plunger 6 or by detecting the beginning of a fuel injection through the injection nozzles 13.

Furthermore, throughout the illustrated embodiments, the volume of the variable volume chamber 39 may be varied by applying a voltage to the piezoelectric actuator 28 from an external source.

The present invention is applicable to fuel injection systems incorporating various types of injection pumps such as those wherein the delivery rate is mechanically metered by a governor mechanism or is electronically controlled.

The features of the present invention have been described in detail herein. In summary, the fuel injection system according to the present invention is designed in such a manner that, during the delivery stroke of the plunger 6 the variable volume chamber 39 is communicated with the pumping chamber 3 only for the initial stage of the delivery stroke for fuel injection. During this initial stage, the rate of injection may be controlled to perform pilot injections by actuating the piezoelectric actuator 28. During the subsequent stage, wherein the fuel pressure in the pumping chamber 3 reaches the high level required to perform main injection pulses, the variable volume chamber 39 is isolated from the pumping chamber 3. Thus, the piezoelectric elements of the actuator 28 are not repeatedly subjected to an excessively high load that would otherwise arise due to the high pressure in the pumping chamber 3 if the variable volume chamber 39 were permanently communicated with the pumping chamber 3. This considerably improves the durability and reliability of the piezoelectric elements of the actuator 28 so that the fuel injection system may be operated with improved reliability for an extended period.

We claim:

1. A fuel injection system for a diesel engine, comprising:
   (a) a fuel injection pump for delivering a controlled quantity of high pressure fuel cyclically at a timing synchronized with the operation of the engine, said pump having a pump cylinder and a pump plunger received therein for reciprocating movement to define a pumping chamber;
   (b) a fuel injection nozzle hydraulically connected to said injection pump for receiving high pressure fuel therefrom and injecting the fuel into an engine cylinder;
   (c) means for controlling a rate of injection of the system in response to operating conditions of the engine, said means having a variable volume chamber and an electronically controlled piezoelectric actuator operable to vary the volume of the variable volume chamber in a controlled timed relationship with the reciprocating movement of the pump plunger; and
   (d) passage means for providing, during each delivery stroke of the pump plunger, fluid communication between said pumping chamber and said variable volume chamber only for a predetermined initial phase of the delivery stroke, whereby said variable volume chamber is hydraulically isolated from said pumping chamber during subsequent phases of the delivery stroke.

2. A fuel injection system according to claim 1, wherein said passage means comprises a first end opening into said pumping chamber and a second end opening into said variable volume chamber, said first end being arranged in such a position that it is in fluid communication with said pumping chamber when a distance of travel of said pump plunger from the bottom dead center position thereof is less than a predetermined value and that said first end is closed by said pump plunger as it travels beyond said predetermined distance of travel.

3. A fuel injection system according to claim 1, wherein said passage means comprises a first passage having a first end thereof opening into a cylinder bore of said pump cylinder at a location remote from said pumping chamber and a second end thereof opening into said variable volume chamber, said passage means further comprising a second passage formed in said pump plunger and having a first end in permanent fluid communication with said pumping chamber and a second end opening onto the outer periphery of said pump plunger, said first end of said first passage and said second end of said second passage being so positioned that said first and second passages are communicated with each other when the distance of travel of the pump plunger from the bottom dead center position thereof is less than a predetermined value and that fluid communication between said first and second passages is interrupted when the pump plunger travels beyond said predetermined travel distance.

4. A fuel injection system for use in a diesel engine, comprising:
   (a) a fuel injection pump of the rotary-distributor type for cyclically delivering a controlled quantity of high pressure fuel, said pump having a pump cylinder and a pump plunger movably received therein to define a pumping chamber, said pump plunger being driven for reciprocating movement and for rotational movement in a synchronized relationship with the operation of the engine, said pump plunger having a central port in communication with said pumping chamber;
   (b) a fuel injection nozzle operatively connected with said injection pump for receiving the high pressure fuel therefrom and for injecting it into an engine cylinder;
   (c) means for controlling the rate of injection of the system in response to varying operating conditions of the engine, said means having a variable volume chamber and an electronically controlled piezoelectric actuator operable to vary the volume of said variable volume chamber in a controlled timed relationship with the movement of the pump plunger; and
   (d) means for providing fluid communication between said pumping chamber and said variable volume chamber in such a manner that, during each delivery stroke of said pump plunger, said pumping chamber is communicated for control of the rate of injection with said variable volume chamber only for a predetermined initial stage of pumping stroke of said pump plunger.

5. A fuel injection system according to claim 4, wherein said means for providing fluid communication comprises:
- a passage having a first end opening on the inner wall of the pump cylinder at an axial position remote from said pumping chamber and a second end opening into said variable volume chamber;
- an annular groove formed on the circumferential periphery of the pump plunger; and
- a passage in said pump plunger for connecting said groove with said central port;
- the relative axial positioning between said annular groove and said first end of said passage being such that said annular groove is brought into an overlapping relationship with said first end of the passage only for a predetermined limited distance of travel of said pump plunger from the bottom dead center position thereof.

6. A fuel injection system according to claim 5, wherein said means for controlling the rate of injection of the system is arranged coaxially with the fuel injection pump.

7. A fuel injection system according to claim 5, wherein said means for controlling the rate of injection of the system is arranged perpendicularly to the fuel injection pump.

8. A fuel injection system according to claim 4, wherein said pump plunger has an axially extending intake groove provided on the circumferential periphery of the pump plunger at a head region thereof, said intake groove opening into said pumping chamber, and wherein said means for providing fluid communication comprises a passage having an end thereof opening into said variable volume chamber, the other end of said passage being open on the inner wall of the pump cylinder, the axial position of said other end of the passage being such that said other end is in fluid communication with said pumping chamber until said pump plunger travels through a predetermined limited distance of travel from the bottom dead center position thereof, the angular position of said other end of the passage being such that said other end becomes in fluid communication with said intake groove upon commencement of the intake stroke of the pump plunger.

* * * * *